Aug. 19, 1941.　　　J. C. KERNICK　　　2,253,434
HOLDER FOR FOODSTUFFS WHILE ROASTING
Filed April 23, 1940
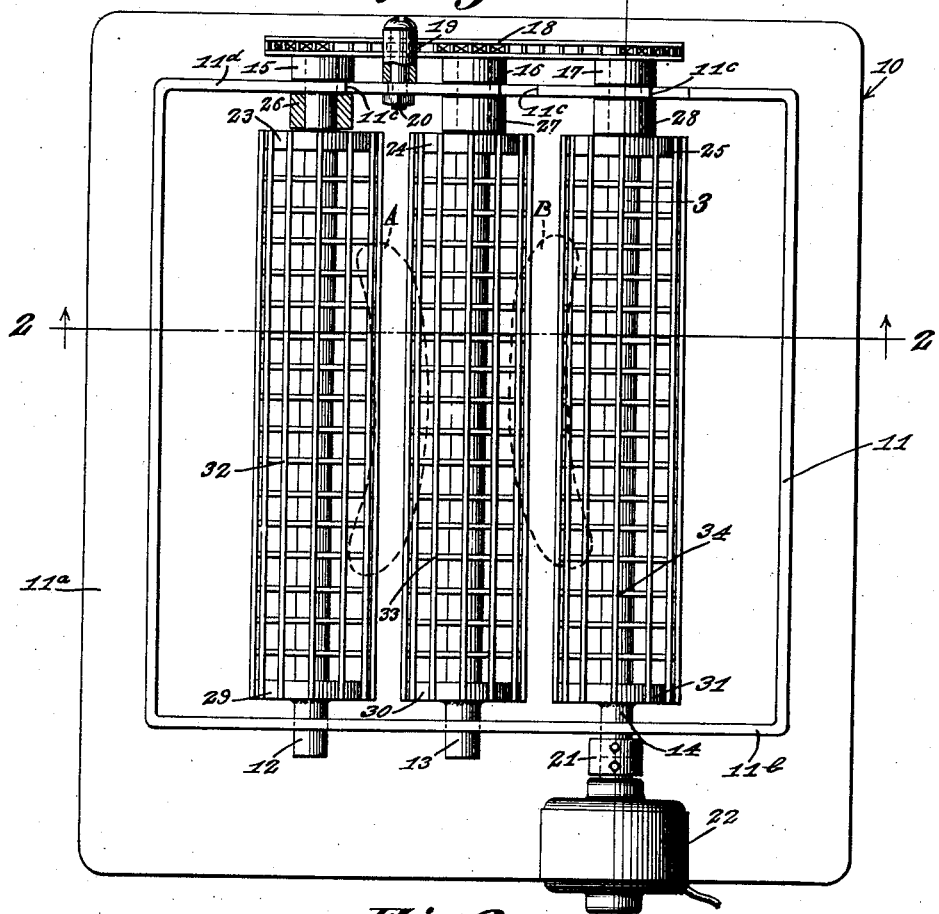
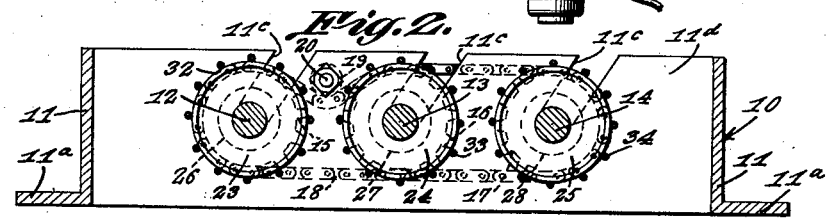
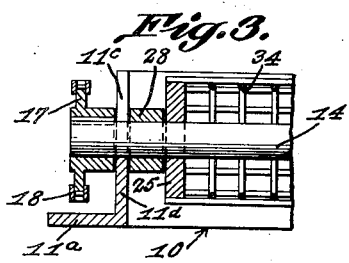
John C. Kernick, INVENTOR
BY Victor J. Evans & Co.
ATTORNEYS Patented Aug. 19, 1941

2,253,434

UNITED STATES PATENT OFFICE 2,253,434

HOLDER FOR FOODSTUFFS WHILE ROASTING

John C. Kernick, Danbury, Conn.

Application April 23, 1940, Serial No. 331,237

3 Claims. (Cl. 53—5)

This invention relates to improvements in devices useful in holding foodstuffs while cooking and particularly is concerned with a novel apparatus for holding meats such as sausages and the like while roasting.

It is among the most important objects of this invention to provide an apparatus adapted to holding a plurality of pieces of meat such as sausages or the like above a heat source in a manner permitting movement of the meat to assure even distribution of heating promoting uniformity in the cooked product.

A further object of this invention is to provide means for holding foodstuffs such as meats of the mentioned types without necessitating use of spits or similar expedients to facilitate turning of the foodstuffs during cooking.

An important advantage of the novel device according to this invention for holding foodstuffs while being roasted is that the device can be adapted for use over open fires, thus permitting its employement for cooking at camps, picnics or the like where an impermanent portable structure is desirable.

Noteworthy among the features of the novel holder according to the present invention are its simplicity and ruggedness of construction, the former suiting the device to the requirements of manufacture under conditions of mass production and the latter assuring long useful life.

Other objects, advantages and features of the new and improved holder according to the present invention will be apparent to those skilled in this art during the course of the following description.

Regarded in certain of its broader aspects the novel device according to the present invention for holding foodstuffs while roasting comprises a plurality of supported essentially parallel conjointly rotatable hollow foraminous cylindrical members cooperating to cause turning of foodstuffs resting thereon when the members are rotated.

In order to facilitate a fuller and more complete understanding of the present invention a specific embodiment thereof herein illustrated will be hereinafter described, it being clearly understood, however, that the illustrated embodiment, although presently preferred, is provided solely by way of example of the practice of this invention and not by way of limitation thereof except insofar as the invention is recited in the subjoined claims.

Referring now to the drawing,

Figure 1 is substantially a top plan view of the presently preferred embodiment of this invention, Fig. 2 is essentially a vertical transverse sectional view of the device illustrated in Fig. 1 taken along the plane indicated by the line 2—2, and Fig. 3 is essentially a vertical sectional detailed view of Fig. 1 taken along the line 3—3 thereof showing features of the roll mounting.

In the accompanying figures of the drawing wherein the preferred embodiment of this invention is illustrated, it will be noted that the device designated by the reference character 10 comprises a rectangular frame 11 having an integrally formed flanged lower edge 11a suiting the device to being mounted in horizontal position upon an open brick oven or the like. A plurality of spindles 12, 13 and 14 are journalled at one end of each in the side portion 11b of the frame 11 and, extending transversely and in spaced parallelism across the frame, are received at their opposite ends in oblique open slots 11c formed in the side 11d of the frame substantially as shown. It is clearly to be understood that the spindles are freely rotatably mounted in the frame in the mentioned manner. Gears 15, 16, and 17, mounted on projecting end portions of the spindles 12, 13 and 14 are associated by a chain 18 in a manner such that rotation of one of the spindles results in rotation of each other spindle in the same direction. A sleeve 19 freely rotatably mounted upon a stud 20 on the portion 11d of the frame 11 normally bears against a part of the chain 18, thereby assuring continuous interengagement of the chain with each of the gears and substantially eliminating looseness of the chain with resultant back lash. A coupling 21 mounted upon the spindle 14 connects a motor 22 with the spindle to permit rotation of the spindle with concomitant rotation of each of the other spindles.

Wheels 23, 24 and 25 are rigidly mounted upon the spindles 12, 13 and 14 and collars 26, 27 and 28 are interposed between the wheels and the frame portion 11d whereby axial movement of the spindles is substantially minimized although free rotation thereof is uninhibited. Similar wheels 29, 30 and 31 are mounted on the spindles 12, 13 and 14 respectively near the opposite ends thereof. Foraminous hollow cylindrical members 32, 33 and 34 are mounted coaxial to the spindles 12, 13 and 14 respectively upon the wheels 23, 24, 25, 29, 30 and 31, the members being spaced with respect to each other in a manner such that foodstuff resting upon the members will not fall therebetween, but instead will be retained near the tops thereof as is illustrated in phantom in Fig. 1 wherein sausages, designated by the reference characters A and B, are shown resting between but upon the members 32, 33 and 34.

The application of the above described device to cooking purposes will be obvious to those skilled in that art. Preferably the device is used by mounting the same upon appropriate supporting means whereby the foraminous cylindrical members are positioned above but near a heat source. The foodstuffs to be cooked are then placed upon the members and the motor operated causing rotation of the members and the foodstuffs.

Cleaning of the device easily is accomplished by removing the cylindrical members, this being easily effectuated by disengagement of the chain 18 from the gears permitting the spindle ends to be lifted upwardly through the oblique slots 11c of the frame portion 11d, thereby allowing the opposite ends of the spindles to be disengaged from the frame permitting easy cleaning of the disengaged apparatus.

It is to be understood that this invention is capable of extended application and is not confined to the precise illustrated forms nor described construction and, therefore, such changes and modifications may be made therein as do not affect the spirit of the invention nor exceed the scope of the appended claims.

Having thus described the present invention, what it is desired to secure by Letters Patent is:

1. A device for holding foodstuffs while roasting comprising a horizontal rectangular frame; a plurality of essentially parallel freely rotatable spindles, each journalled at one end in a side of the frame and at the opposite end received in obliquely extending slots in the opposite side of the frame; gears, one on each of the spindles and driving means connected to one of the spindles for causing simultaneous rotation thereof; and a plurality of hollow foraminous cylinders, one mounted on each of said spindles, cooperating to cause turning of foodstuffs resting thereon when the spindles are rotated.

2. A device for holding foodstuffs while roasting, comprising an open rectangular frame having vertical walls, one wall of the frame having spaced openings, the opposite wall having open ended obliquely arranged spaced slots, cylindrical spaced members having spindles extending beyond the same and removably supported in the openings and the slots, gears carried by the ends of the spindles on the outside of the wall carrying the slots, a chain passing over said gears, and means for driving one of said spindles, whereby all of the cylindrical spaced members are rotated in the same direction.

3. A device for holding foodstuffs while roasting, comprising an open rectangular frame having vertically disposed walls, one wall of the frame having spaced openings, the opposite wall having spaced obliquely arranged slots communicating with the upper edge thereof, cylindrical spaced members having spindles extending beyond the same and removably supported in the openings and the obliquely arranged slots, means carried by the ends of the spindles on the outside of the wall carrying the slots for simultaneously rotating the cylindrical spaced members in a direction corresponding with the downwardly and obliquely arranged slots, whereby the rotation of the cylindrical spaced members causes their spindles to travel downwardly in the obliquely arranged slots.

JOHN C. KERNICK.